United States Patent
Liu et al.

(10) Patent No.: US 7,730,358 B2
(45) Date of Patent: Jun. 1, 2010

(54) STRESS TESTING METHOD OF FILE SYSTEM

(75) Inventors: Tao Liu, Tianjin (CN); Qiu-Yue Duan, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 453 days.

(21) Appl. No.: 11/976,370

(22) Filed: Oct. 24, 2007

(65) Prior Publication Data

US 2009/0113249 A1      Apr. 30, 2009

(51) Int. Cl.
    *G06F 11/00* (2006.01)
(52) U.S. Cl. .................. 714/42; 702/186; 702/182
(58) Field of Classification Search .......... 714/25, 714/42; 702/182, 186
    See application file for complete search history.

(56) References Cited

U.S. PATENT DOCUMENTS

| | | | |
|---|---|---|---|
| 6,647,458 B1 * | 11/2003 | Glynn | 711/112 |
| 6,845,344 B1 * | 1/2005 | Lally et al. | 702/186 |
| 6,859,758 B1 * | 2/2005 | Prabhakaran et al. | 702/186 |
| 7,054,790 B1 * | 5/2006 | Rich | 702/186 |
| 7,171,338 B1 * | 1/2007 | Goguen et al. | 702/186 |
| 7,444,267 B2 * | 10/2008 | Hagerott et al. | 702/186 |
| 7,567,886 B2 * | 7/2009 | Beeston et al. | 702/182 |
| 2009/0300426 A1 * | 12/2009 | Eccles et al. | 714/42 |

* cited by examiner

*Primary Examiner*—Marc Duncan
(74) *Attorney, Agent, or Firm*—Rabin & Berdo, P.C.

(57) ABSTRACT

A stress testing method of a file system includes traversing local or network storage devices with a drive letter; detecting a network mapping path of the network storage devices; calculating an absolute path of all the storage devices through a mounted point and a system volume; collecting the above information to update the path information of the file system; and then calling a corresponding test algorithm and stressing strategy according to different types of storage devices, so as to perform the stress test. The stress testing method can make the file system display storage devices without a drive letter, and call appropriate testing methods and stressing strategies for different types of storage devices, so the depth and scope of the stress testing for file system are expanded, the accuracy of the test is enhanced, and the problem of occupying too many system resources is avoided.

18 Claims, 9 Drawing Sheets

STRESS TESTING METHOD OF FILE SYSTEM

BACKGROUND OF THE INVENTION

1. Field of Invention

The present invention relates to a stress testing method, and more particularly to a stress testing method of performing file read/write on different types of system disks in a file system.

2. Related Art

"File system" refers to a management interface and a method to name a file, store a file, and organize a storage location for a file in a computer. Each operating system has a corresponding file system, for example, NTFS for Windows NT and EXT3 for LINUX. Through these file systems, users can systematically store a file into a storage device of the computer and effectively access the stored file. With the improvement of computer technology and the development of computer network technology, the storage space managed by the file system is no longer limited to devices such as hard disk of a single computer. For example, any folder can be connected to the computer through a USB hard disk or USB flash disk and mounted on the file system, so as to increase the capacity of the file system; or a remote server can be connected through network and the storage space in the server is considered as a logical disk or folder in the file system.

To build a file system, a stress testing should be performed to make sure that no data read/write error occurs due to frequent read/write of the data stored in the file system. The so-called stress testing is performing frequent read/write operations on the file system in a period of time, and recording whether there is an access error and the disk partition where the access error occurs. However, the building scope of the file system grows, the physical storage devices contained in the file system increase, and the constituted document files become more complicated, and thus the stress testing has become more complicated. At present, the stress testing of a file system generally has the following problems. The first problem is lacking of testing coverage and scope. The storage devices mounted on the computer system cannot be completely displayed on the file system due to insufficient drive letters. As some storage devices mounted on the file system cannot show their drive letters, the stress testing cannot be performed on these storage devices. The second problem is the problem of testing stress. As different types of storage devices support different read/write speeds, if storage devices of different read/write speeds are tested with equivalent testing data, for some storage devices of higher read/write speeds, their actual read/write rates may not be detected. The third problem is that a single test takes too much time and also occupies too many system resources.

SUMMARY OF THE INVENTION

In view of the above problems in the stress testing of a file system, the present invention is directed to find out all the system disks including those without a drive letter, and calling different testing algorithms to perform a stress testing on the different types of system disks, so as to ensure the accuracy of the stress testing performed on the file system.

In order to achieve the above objective, a stress testing method of a file system is provided. The method includes traversing multiple system disks with a drive letter among the system disks; detecting multiple network storage devices, so as to obtain network mapping disk drives and a network mapping path corresponding to the network storage devices in the current network; accessing a system volume of the system disks to obtain a mounted point, and calculating an absolute path of the system disks according to the mounted point and a root volume and a target volume stored in the computer; collecting the drive letters, the network mapping path of the network storage devices, and the absolute path of the system disks, and updating the file system of the computer; and calling a testing algorithm and a stressing strategy corresponding to a test target, so as to perform a stress testing directing to different types of the system disks.

In the stress testing method of a file system according to a preferred embodiment of the present invention, the system disks include local storage devices and network storage devices. The storage devices can be a built-in hard disk, an external hard disk, a USB flash disk, a floppy drive, an optical disk drive, and other attached storage media. Further, as the drive letters that can be assigned by the computer operating system are limited, some system disks do not have a drive letter.

In the stress testing method of a file system according to a preferred embodiment of the present invention, according to an adopted test target, a testing algorithm is called by a corresponding stressing strategy to perform a stress testing. The test target is, for example, testing the network mapping disk drive, the optical disk drive in the system disks, the built-in hard disk in the system disks, and storage devices other than the built-in hard disk in the system disks. The stressing strategy is, for example, testing time control, multi-threading call, document transmission capacity set, sample document select, cache memory select, read/write of the registering spaces of system disks, and testing methods of a multi-level directory. The called testing algorithm includes sample document transmission testing algorithm, memory read/write testing algorithm, document mapping testing algorithm, and large capacity document transmission testing algorithm.

In the stress testing method of a file system according to a preferred embodiment of the present invention, the sample document transmission testing algorithm includes: a. allocating a first registering space and a second registering space in the computer; b. writing the content of a sample document into the first registering space; c. duplicating the sample document to obtain a duplicated document, and writing the duplicated document into a target system disk under test; d. reading the duplicated document from the target system disk, and writing the content of the duplicated document into the second registering space; e. comparing the contents of the first and second registering spaces to obtain a test result; and f. repeating the above steps a-e to complete the preset test times.

In the stress testing method of a file system according to a preferred embodiment of the present invention, a file read testing of the document mapping testing algorithm includes a. reading a document from a target system disk, and mapping the identification data and content of the document to a document mapping space in the memory of the computer; b. duplicating the document to a registering space allocated by the computer; and c. comparing to see whether the contents of the document mapping space and the registering space are identical, so as to obtain a test result. A file write test of the document mapping testing algorithm includes: a. establishing a document, and duplicating the document to a registering space allocated by the computer; b. writing the document into a target system disk, and mapping the identification data and content of the document to a document mapping space in the memory of the computer; and c. comparing to see whether the contents of the document mapping space and the registering space are identical, so as to obtain a test result.

In the stress testing method of a file system according to a preferred embodiment of the present invention, an intensive stress test of the large capacity document transmission testing algorithm includes: a. verifying remaining capacities of a first target system disk and a second target system disk, and adjusting the capacity of a document according to a minimum remaining capacity; b. allocating a registering space having the same capacity as the document in the computer, and filling the registering space with a test data; c. copying the content of the registering space to the document, and writing the document into the first target system disk and the second target system disk; and d. comparing to see whether the contents of the document in the first target system disk and the second target system disk are identical, so as to obtain a test result Further, a high efficiency test of the large capacity document transmission testing algorithm includes: a. allocating a registering space in the computer, and filling the registering space with a test data; b. verifying that the remaining capacities of a first target system disk and a second target system disk are larger than the registering space; c. writing the content of the registering space into the first target system disk in multiple consecutive times to form a complete document; d. transmitting the document to the second target system disk; and e. respectively comparing to see whether the content of the registering space is identical to the content of the document in the first target system disk and the content of the document in the second target system disk, so as to obtain a test result.

In view of the above, the present invention traverses drive letters and finds out mounted points; calculates path addresses of all the storage devices through those mounted points, a system volume, a root volume, and a target volume, so as to update the information of the system disks in the file system; thereby calling an algorithm corresponding to a test target and performing a stress testing with an appropriate stressing strategy. Therefore, the lacking of testing coverage and scope of the current stress testing can be overcome, and the problem that the applied test stressing is not suitable for all types of storage devices in the file system can be solved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The objectives and execution method of the present invention are illustrated in detail in the following preferred embodiments. However, the concept of the present invention can also be applied to other scopes. The following embodiments are only adopted to illustrate the objectives and execution method of the present invention, instead of limiting the scope of the present invention.

Figure 1:
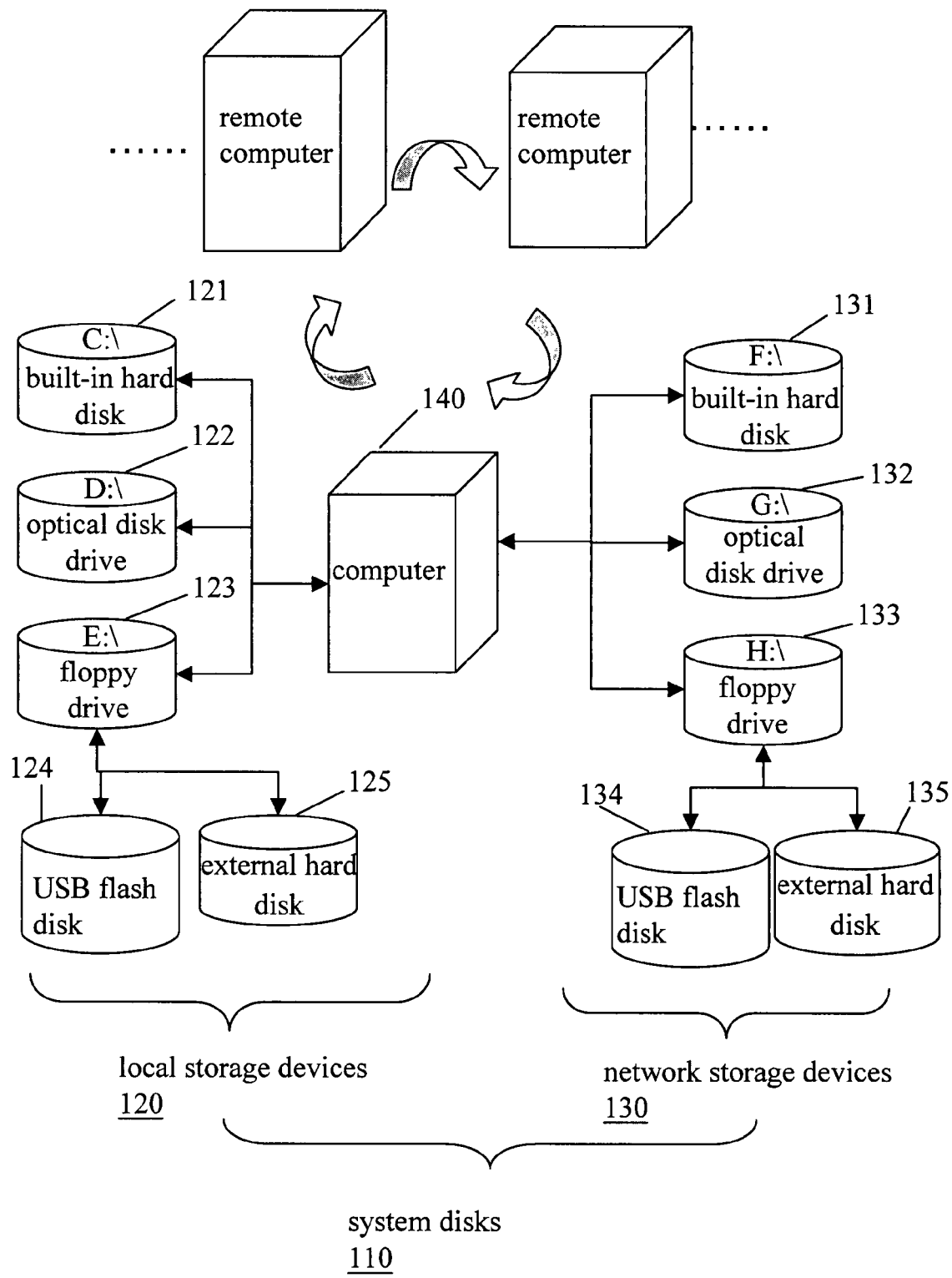
FIG. 1 is a schematic view of the system architecture of a file system according to a preferred embodiment of the present invention.

Before the stress test method of a file system provided by the present invention is illustrated, the architecture of a file system is described with the accompanying drawing. FIG. 1 is a schematic view of the system architecture of a file system according to a preferred embodiment of the present invention. Referring to FIG. 1, a computer 140 has local storage devices 120, including storage devices such as a built-in hard disk 121, an optical disk drive 122, a floppy drive 123, a USB flash disk 124, and an external hard disk 125; and has remote network storage devices 130 accessed through the Internet, including a built-in hard disk 131, an optical disk drive 132, and a floppy drive 133 that can be installed in a remote server, or storage devices such as a USB flash disk 134 and an external hard disk 135 that can be attached to the remote server. The built-in hard disk 121 of the computer 140 is installed with an operating system and a corresponding file system. The file system can capture drive letters of the system disks 110 (including the local storage devices 120 and remote network storage devices 130), but can only capture 26 storage devices at most (as the drive letter is an English letter of one character) due to the limitation of the file system on the drive letter, so some system disks 110 may not be allocated with a drive letter. In this embodiment, in the local storage devices 120, the drive letter of the built-in hard disk 121 is C:\, the drive letter of the optical disk drive 122 is D:\, and the drive letter of the floppy drive 123 is E:\, in the network storage devices 130, the drive letter of the built-in hard disk 131 is F:\, the drive letter of the optical disk drive 132 is G:\, and the drive letter of the floppy drive 133 is H:\. The USB flash disk 124 and external hard disk 125 of the local storage devices 120 and the USB flash disk 134 and external hard disk 135 of the network storage devices 130 do not have a drive letter. Those system disks without a drive letter can be set with a mounted point and mounted on any folder of the system disks with a drive letter, so as to increase the capacity of the file system.

Figure 2:
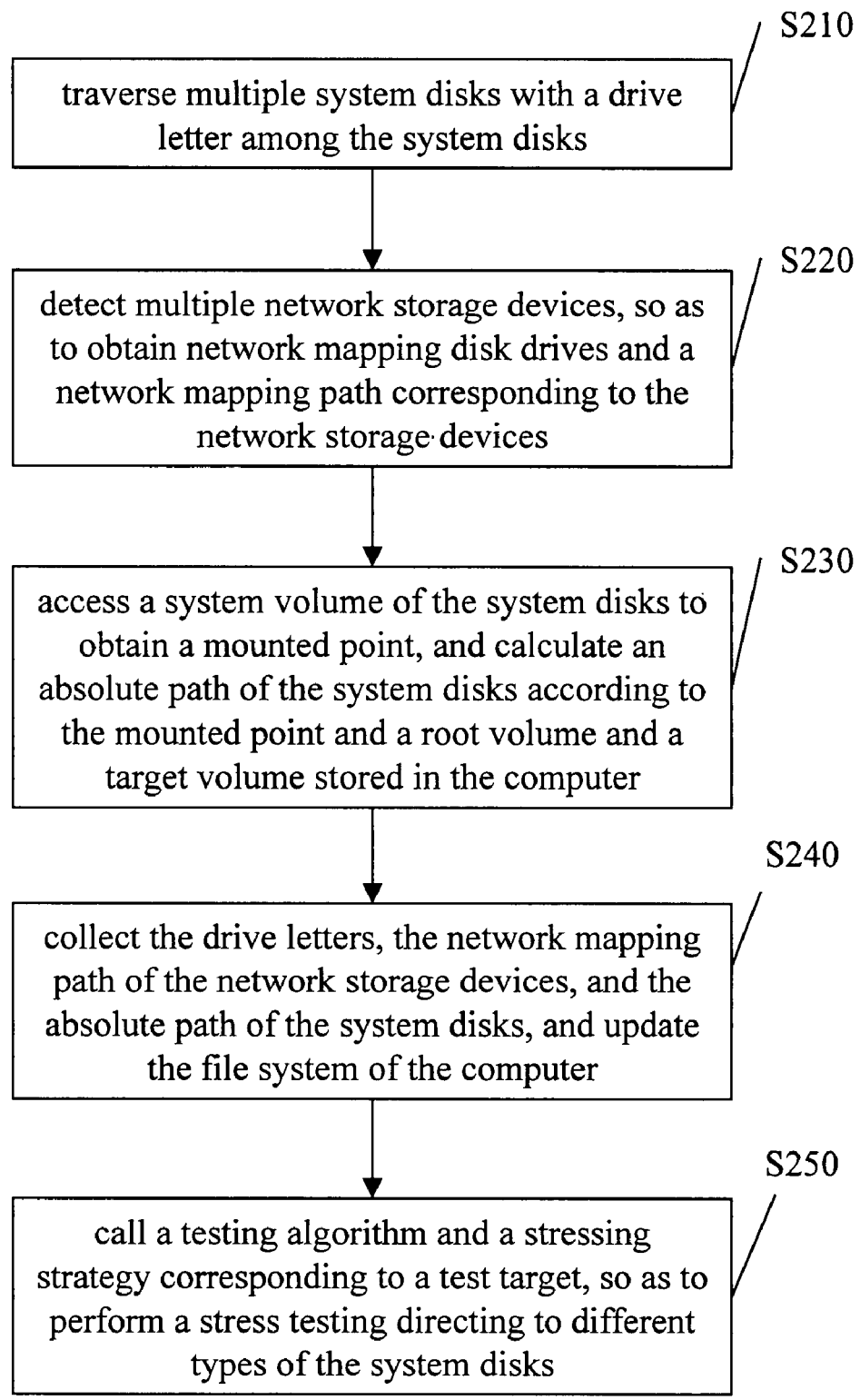
FIG. 2 is a flow chart of a stress testing method of a file system according to a preferred embodiment of the present invention.

FIG. 2 is a flow chart of a stress test method of a file system according to a preferred embodiment of the present invention. Referring to FIG. 2, the stress test method of a file system includes: traversing multiple system disks with a drive letter among the system disks (Step S210); detecting multiple network storage devices, so as to obtain network mapping disk drives and a network mapping path corresponding to the network storage devices (Step S220); accessing a system volume of the system disks to obtain a mounted point, and calculating an absolute path of the system disks according to the mounted point and a root volume and a target volume stored in the computer (Step S230); collecting the drive letters, the network mapping path of the network storage devices, and the absolute path of the system disks, and updating the file system of the computer (Step S240); and calling a testing algorithm and a stressing strategy corresponding to a test target, so as to perform a stress testing directing to different types of the system disks (Step S250).

Next, a preferred embodiment is adopted to illustrate the present invention. Referring to FIGS. 1 and 2 simultaneously, as not every system disk has a drive letter, if a stress testing is only performed on system disks with a drive letter in the file system, quite a lot of the system disks that are mounted on a folder and without a drive letter may not be tested. Thus, during the stress testing on the system disks, those system disks without a drive letter should be found out in the file system.

First, multiple system disks with a drive letter among the system disks are traversed (including recording the types of the system disks). Next, the computer 140 sends a detection instruction to ensure the accessible network storage devices. After the detection instruction is sent out, network mapping disk drives are obtained, and the storage spaces shared by the server can be regarded as a virtual system disk via the network mapping disk drives. The file system allocates a drive letter to the network mapping disk drives. Due to the lacking of drive letters, some network mapping disk drives do not have a drive letter; however, the network mapping disk drives all have a network mapping path despite whether they have a drive letter or not. The computer 140 can obtain the network mapping paths through a control instruction. Afterward, the computer 140 accesses a system volume on the system disks with a drive letter, so as to find out at least one mounted point. An absolute path of all the system disks is calculated through the mounted point(s), and a root volume and a target volume stored in the main disk (the hard disk for installing the operating system) of the computer 140 (the calculation formula is root volume+mount point+target volume).

Figure 3:
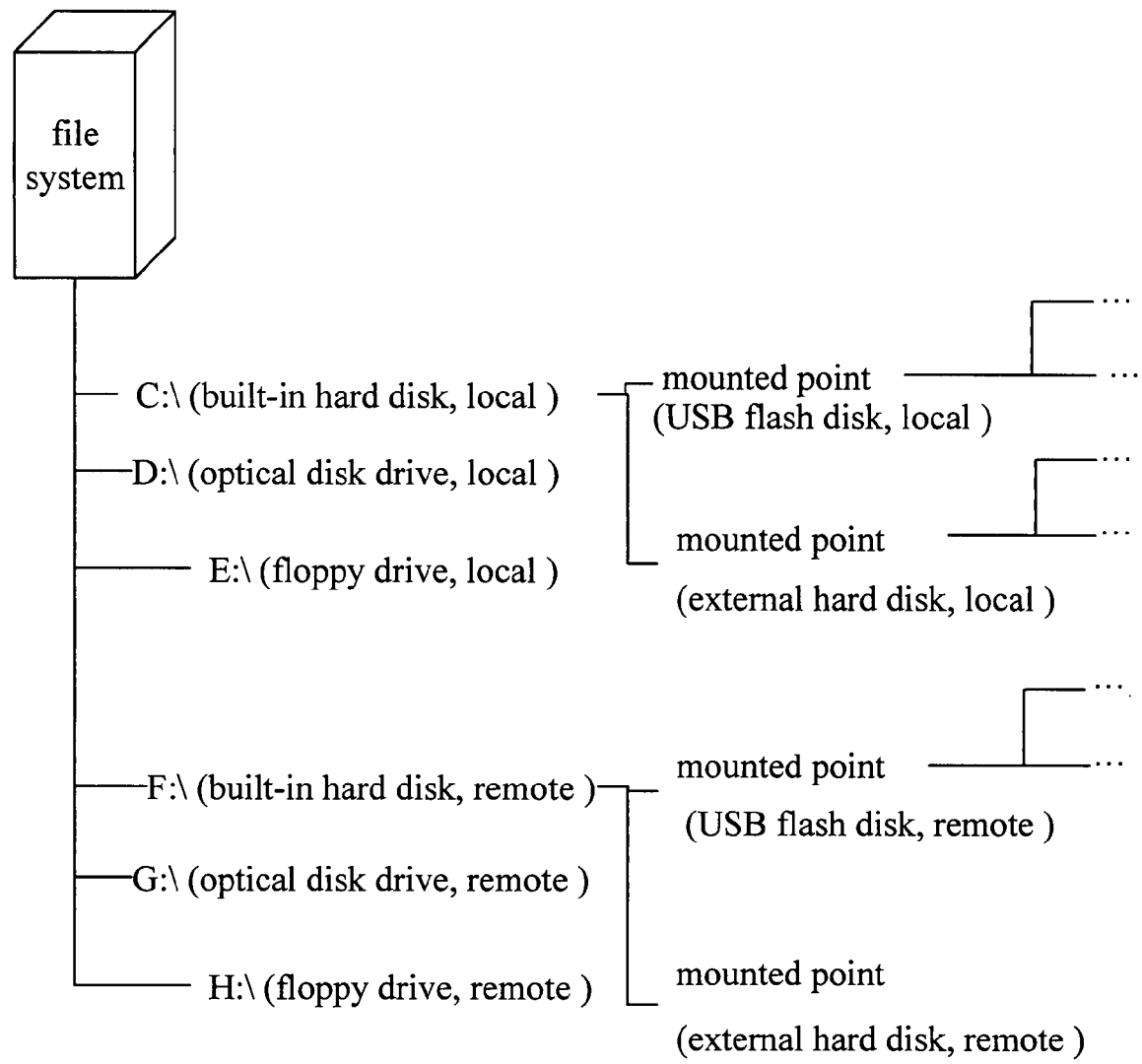
FIG. 3 is a schematic view of file system paths according to a preferred embodiment of the present invention.

FIG. 3 is a schematic view of file system paths according to a preferred embodiment of the present invention. Referring to FIG. 3, after obtaining the system disks with a drive letter and the absolute path and network mapping path of each system disk, all the information is collected to update the records in the file system of the computer. As shown in FIG. 3, the displayed path information further includes the type of the system disks and the determinations on the local/network storage devices. Besides, for the system disks without a drive letter, the mounted points thereof are also recorded in the path information. Till now, all the system disks in the file system and the path information thereof are established completely.

Finally, a testing algorithm and a stressing strategy corresponding to the test target are called, so as to perform a stress testing directing to different types of the system disks. In this embodiment, if the test target is testing the network mapping disk drive, an identification process should be added to identify the network mapping disk drives, so as to find out whether there are unidentified network mapping disk drives through repetitive scanning. If the test target is testing the optical disk drive in the system disks (including the local optical disk drive or the accessible remote optical disk drive), only a file read testing is performed, and a write testing (file write test) is skipped. If the test target is testing local/remote network storage devices other than the built-in hard disk, for example, storage devices of a relatively small capacity such as USB flash disk and external hard disk, the size of the test document should be adjusted according to the capacity of the storage devices, and a large document transmission test is skipped. Further, the stressing strategy includes testing time control, multi-threading call, document transmission capacity set, sample document select, cache memory select, read/write of the registering spaces of system disks, and testing methods of a multi-level directory.

After the test target is determined, the callable test algorithms includes sample document transmission test algorithm, memory read/write testing algorithm, document mapping testing algorithm, and large capacity document transmission testing algorithm. The sample document transmission testing algorithm is used to verify whether a read/write error will occur under frequent read/write operations of the system disks, so as to verify whether the file system is stable. The computer operating system partitions a virtual memory from the main disk, and the file system records some documents into the document mapping block of the virtual memory through document mapping. The document mapping testing algorithm is used to test whether the document mapping block can be properly mapped to each system disk, and whether the document mapping block can be properly accessed. The large capacity document transmission testing algorithm is used to verify whether the system disks can be properly accessed when the document system is transmitting large capacity documents (these documents are usually larger than 100 M byte, some even exceed 1 G byte).

Figure 4:
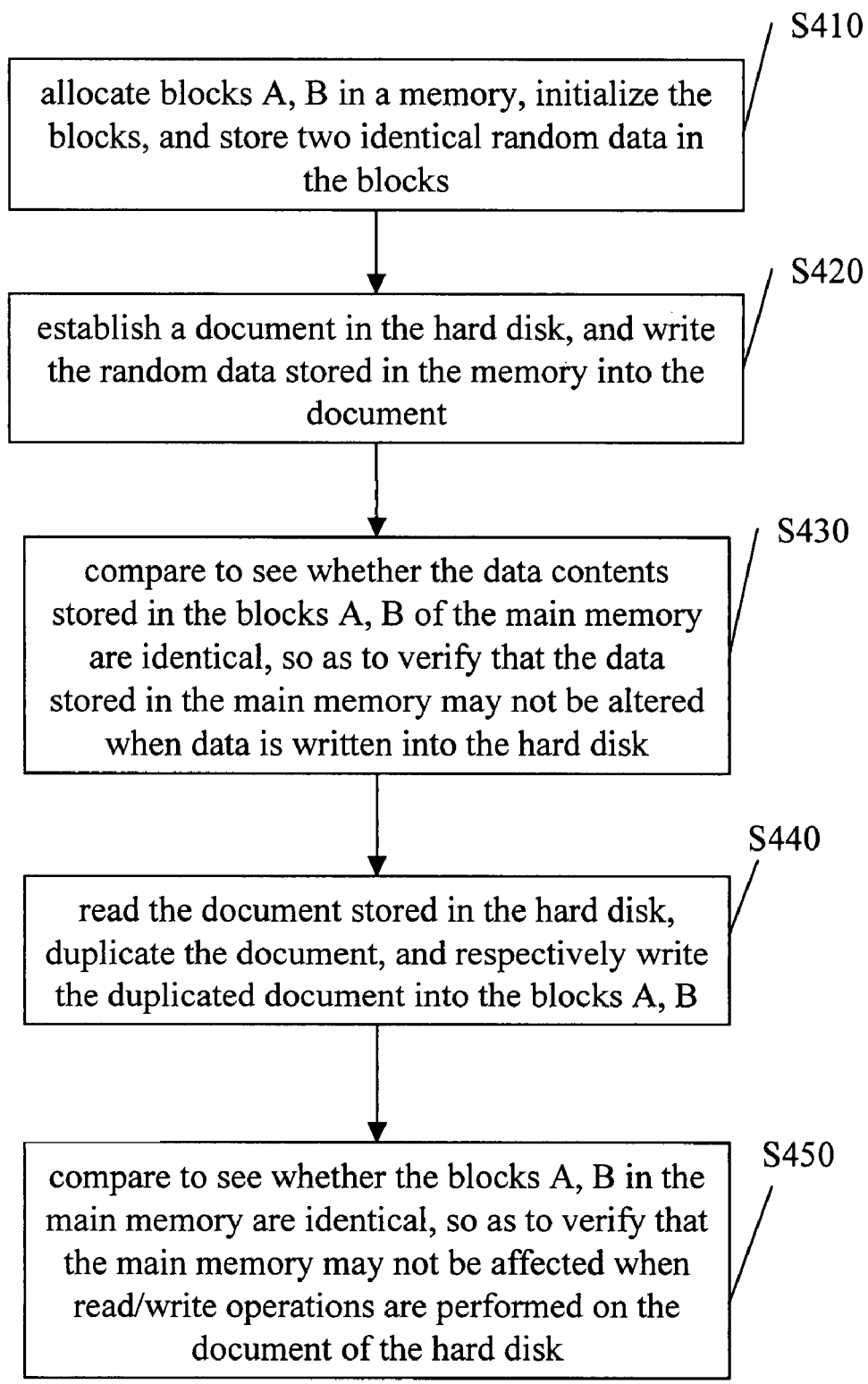
FIG. 4 is a flow chart of the memory read/write testing algorithm according to a preferred embodiment of the present invention.

The above testing algorithms are illustrated in the following paragraphs:

FIG. 4 is a flow chart of the memory read/write test algorithm according to a preferred embodiment of the present invention. Referring to FIG. 4, the memory read/write testing algorithm is used to verify whether the accuracy of the operations of the memory and the hard disk will be affected when the content stored in the blocks of different sizes in the memory is frequently moved and written into the document in the hard disk, and test whether the computer system can still operate normally under such high stress. The algorithm mainly controls multiple blocks in the read/write memory through multi-threading, so as to move and write the content of the blocks stored in the memory into the hard disk at a time. The memory read/write testing algorithm includes: first, allocating a first block and a second block (referred to as blocks A, B below) in a memory, initializing the blocks, and storing two identical random data in the blocks (storing identical data in the blocks A, B, referring to Step S410); next, establishing a document in the hard disk, and writing the random data stored in the memory into the document (Step S420); after that, comparing to see whether the data contents stored in the blocks A, B of the main memory are identical, so as to verify that the data stored in the main memory may not be altered when data is written into the hard disk (Step S430); then, reading the document stored in the hard disk, duplicating the document, and respectively writing the duplicated document into the blocks A, B (Step S440); finally, comparing to see whether the blocks A, B in the main memory are identical, so as to verify that the main memory may not be affected when read/write operations are performed on the document of the hard disk (Step S450), and releasing the main memory space after the testing. Further, the memory read/write test algorithm further includes ascending the sizes of the blocks A, B allocated in the main memory. The spaces of the blocks A, B are ascended from 1 page (memory page), 2 page, 4 page to 1024 page (i.e., the size of the block of the memory is ascended by a multiple of $2^n$).

Figure 5:
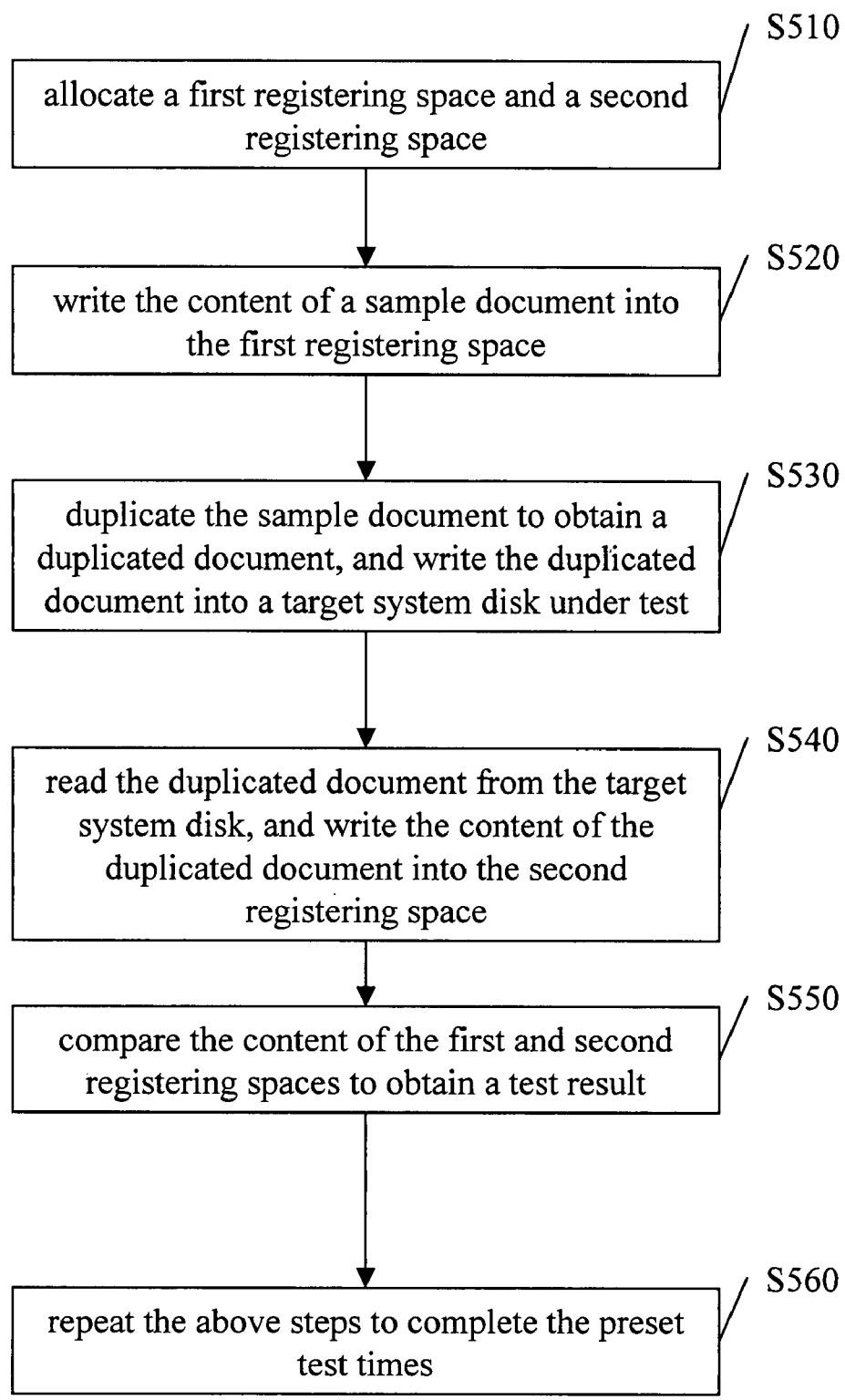
FIG. 5 is a flow chart of the sample document transmission testing algorithm according to a preferred embodiment of the present invention.

FIG. 5 is a flow chart of the sample document transmission test algorithm according to a preferred embodiment of the present invention. Referring to FIG. 5, the sample document transmission test algorithm includes: first, allocating a first registering space and a second registering space (Step S510), in which the first and second registering spaces are a space in a memory assigned by the operating system, for temporarily storing the data written in; next, writing the content of a sample document into the first registering space (Step S520); after that, duplicating the sample document to obtain a duplicated document, and writing the duplicated document into a target system disk under test (Step S530); then, reading the duplicated document from the target system disk, and writing the content of the duplicated document into the second registering space (Step S540); comparing the contents of the first and second registering spaces to obtain a test result (Step S550); though till now, the test on a single document transmission is finished, to enhance the reliability of the read/write function of the file system, repeating the above steps (i.e., S510-S550) to complete the preset test times (Step S560), so as to test whether the file system can still operate normally after multiple times of document transmission.

Figure 6A:
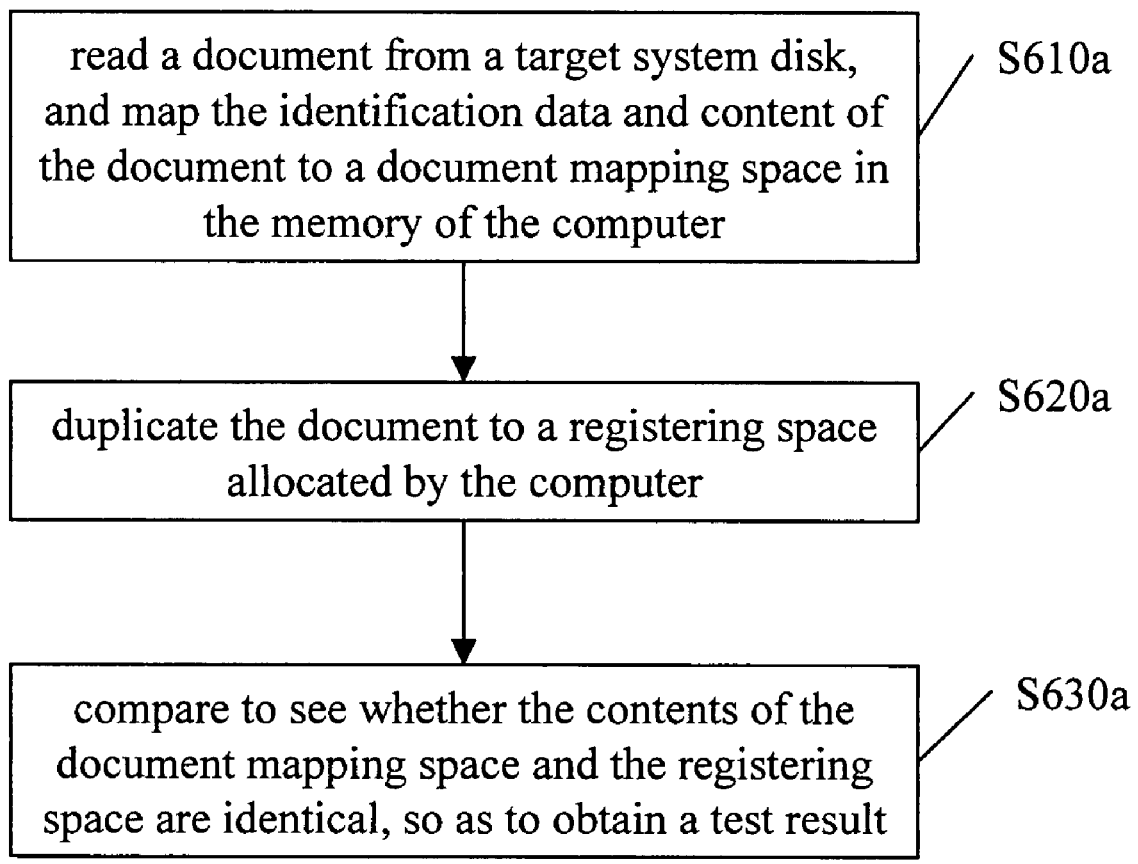
FIG. 6a is a flow chart of the file read test of the document mapping testing algorithm according to a preferred embodiment of the present invention.

The document mapping testing algorithm includes a file read test and a file write test, which are respectively illustrated with reference to flow charts FIG. 6a and FIG. 6b. FIG. 6a is a flow chart of the file read test of the document mapping testing algorithm according to a preferred embodiment of the present invention. Referring to FIG. 6a, the file read test of the document mapping testing algorithm includes: first, reading a document from a target system disk, and mapping the identification data (for example, information about the file name and creation date) and content of the document to a document mapping space in the memory of the computer (Step S610a), in which the document mapping space is a storage space composed by multiple memory pages, or by the pages of the virtual memory in the main disk of the computer instead of the memory of the computer in other embodiments; then, duplicating the document to a registering space allocated by the computer (Step S620a), in which the registering space can be an assigned memory space or the space of the main disk of the computer; finally, comparing to see whether the contents of the document mapping space and the registering space are identical, so as to obtain a test result (Step S630a).

Figure 6B:
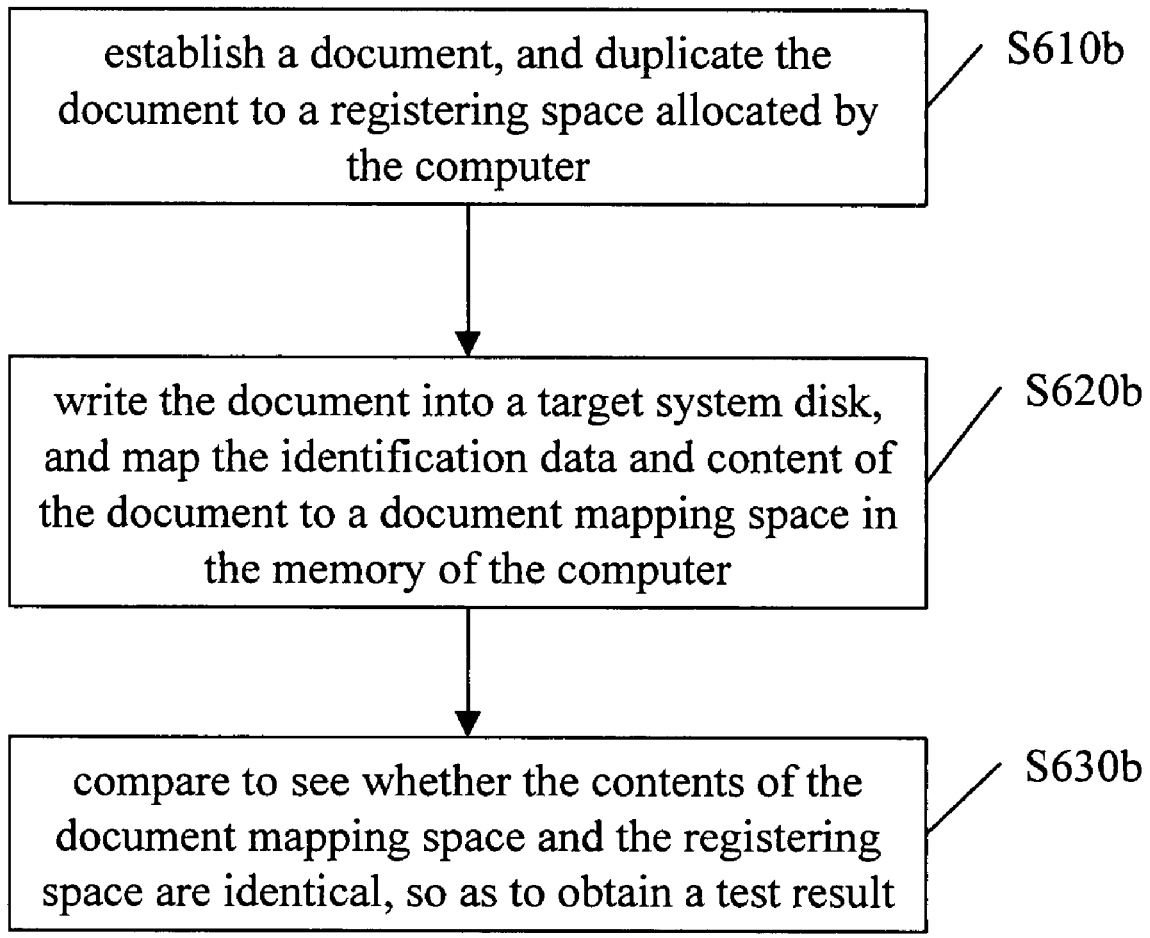
FIG. 6b is a flow chart of the file write test of the document mapping testing algorithm according to a preferred embodiment of the present invention.

FIG. 6b is a flow chart of the file write test of the document mapping testing algorithm according to a preferred embodiment of the present invention. Referring to FIG. 6b, the file write test of the document mapping testing algorithm includes: first, establishing a document, and duplicating the document to a registering space allocated by the computer (Step S610b), in which the registering space is an assigned memory space or the space of the main disk of the computer; then, writing the document into a target system disk, and mapping the identification data and content of the document to a document mapping space in the memory of the computer (Step S620b); finally, comparing to see whether the contents of the document mapping space and the registering space are identical, so as to obtain a test result (Step S630b).

The test strategy of the large capacity document transmission testing algorithm includes two processes, namely an intensive stress test and a high efficiency test. The intensive stress test is used to test the accuracy of the file system on transmitting a document exceeding 100 M byte (or even over 1 G byte). The high efficiency test is used to test a storage device by continuously writing in test data segments to form a large capacity document under a test stress and test time. As the large capacity document does not have to be written in at a time, the high efficiency test occupies fewer system read/write resources compared with the intensive stress test. The user can determine whether to adopt the intensive stress test or the high efficiency test to perform a test on a large capacity document according to the current operand of the computer (the quantity of other programs under execution). The intensive stress test and the high efficiency test will be illustrated respectively in the following paragraphs.

Figure 7A:
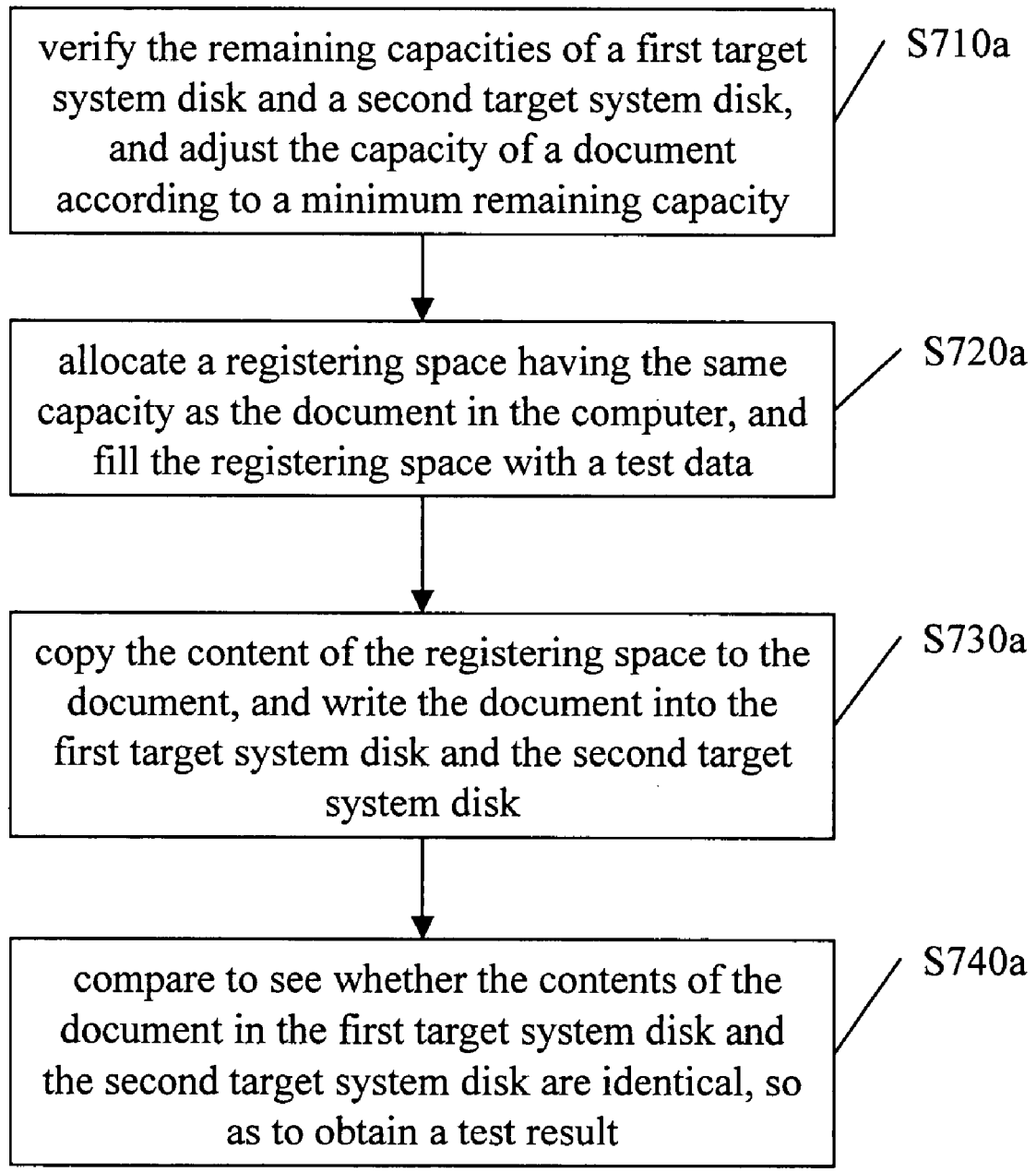
FIG. 7a is a flow chart of the intensive stress testing of the large capacity document transmission test algorithm according to a preferred embodiment of the present invention.

FIG. 7a is a flow chart of the intensive stress test of the large capacity document transmission testing algorithm according to a preferred embodiment of the present invention. Referring to FIG. 7a, the intensive stress test of the large capacity document transmission testing algorithm includes: verifying the remaining capacities of a first target system disk and a second target system disk, and adjusting the capacity of a document according to a minimum remaining capacity (Step S710a); allocating a registering space having the same capacity as the document in the computer, and filling the registering space with a test data (Step S720a); copying the content of the registering space to the document, and writing the document into the first target system disk and the second target system disk (Step S730a); and comparing to see whether the contents of the documents in the first target system disk and the second target system disk are identical, so as to obtain a test result (Step S740a).

Figure 7B:
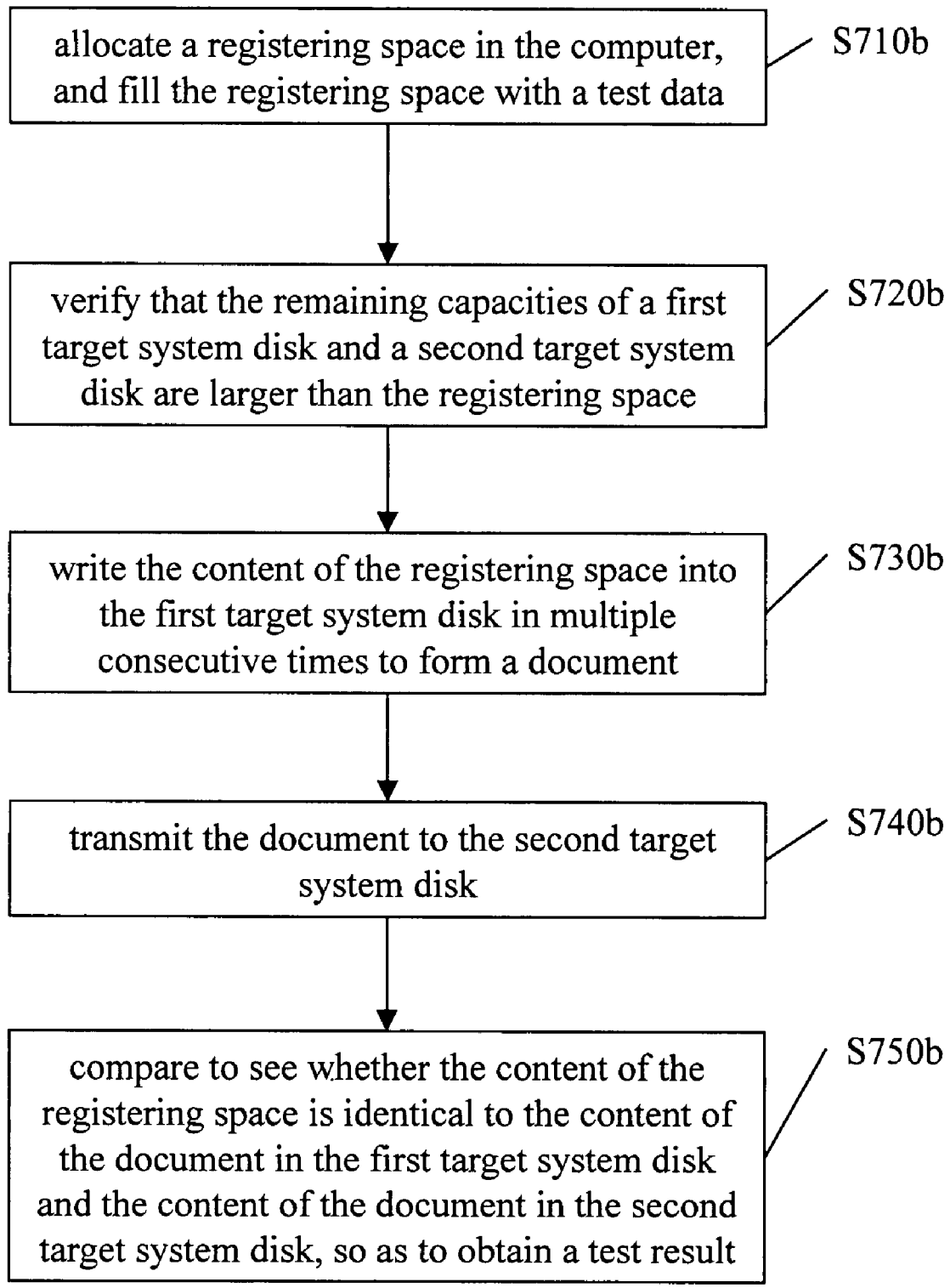
FIG. 7b is a flow chart of the high efficiency test of the large capacity document transmission testing algorithm according to a preferred embodiment of the present invention.

FIG. 7b is a flow chart of the high efficiency test of the large capacity document transmission testing algorithm according to a preferred embodiment of the present invention. Referring to FIG. 7b, the high efficiency test of the large capacity document transmission testing algorithm includes: allocating a registering space in the computer, and filling the registering space with a test data (Step S710b); verifying that the remaining capacities of a first target system disk and a second target system disk are larger than the registering space (Step S720b); writing the content of the registering space into the first target system disk in multiple consecutive times to form a document (Step S730b); transmitting the document to the second target system disk (Step S740b); and respectively comparing to see whether the content of the registering space is identical to the content of the document in the first target system disk and the content of the document in the second target system disk, so as to obtain a test result (Step S750b).

In view of the above, the stress testing method provided by the present invention can make the file system display storage devices without a drive letter, and call an appropriate testing method and stressing strategy according to different types of storage devices, so as to perform a test on the storage devices. As the present invention can also make the file system display storage devices without a drive letter, it is superior to the current file system stress test method on the depth and scope of testing a file system. Further, the file system includes different types of storage devices, and the present invention calls an appropriate testing method and stressing strategy corresponding to the storage devices to test the file system, thus improving the accuracy of the stress test, and avoiding occupying too many system resources.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stress testing method of a file system, executed on a computer, for performing a file read/write test on multiple different types of system disks in a file system, so as to verify the bearing capability of the file system on frequent read/write, the method comprising:

traversing multiple system disks with a drive letter among the system disks;

detecting multiple network storage devices, so as to obtain network mapping disk drives and a network mapping path corresponding to the network storage devices;

accessing a system volume of the system disks to obtain a mounted point, and calculating an absolute path of the system disks according to the mounted point and a root volume and a target volume stored in the computer;

collecting the drive letters, the network mapping path of the network storage devices, and the absolute path of the system disks, and updating the file system of the computer; and calling a test algorithm and a stressing strategy corresponding to a test target, so as to perform a stress test directing to different types of the system disks.

2. The stress testing method of a file system as claimed in claim 1, wherein the system disks are selected from local storage devices and the network storage devices.

3. The stress testing method of a file system as claimed in claim 2, wherein the local storage devices are selected from a built-in hard disk, an external hard disk, a USB flash disk, a floppy drive, an optical disk drive, and other attached storage media.

4. The stress testing method of a file system as claimed in claim 1, wherein the network storage devices are selected from a built-in hard disk, an external hard disk, a USB flash disk, a floppy drive, an optical disk drive, and other attached storage media accessed through network.

5. The stress testing method of a file system as claimed in claim 1, wherein the system disks further comprise system disks without a drive letter.

6. The stress testing method of a file system as claimed in claim 1, wherein the test target is selected from the network mapping disk drive, the optical disk drive in the system disks, the built-in hard disk in the system disks, and storage devices other than the built-in hard disk in the system disks.

7. The stress testing method of a file system as claimed in claim 1, wherein the stressing strategy is selected from testing time control, multi-threading call, document transmission capacity set, sample document select, cache memory select, read/write of the registering spaces of system disks, and test methods of a multi-level directory.

8. The stress testing method of a file system as claimed in claim 1, wherein the testing algorithm is selected from sample document transmission testing algorithm, memory read/write testing algorithm, document mapping testing algorithm, and large capacity document transmission testing algorithm.

9. The stress testing method of a file system as claimed in claim 8, wherein the memory read/write test algorithm comprises:

allocating a first block and a second block in a memory, initializing the first block and the second block, so as to store two identical random data in the first block and the second block;

establishing a document in the hard disk, and writing the random data stored in the first block and the second block into the document;

comparing to see whether the data contents of the first block and the second block are identical;

reading the document stored in the hard disk, duplicating the document, and respectively writing the duplicated document into the first block and the second block; and comparing to see whether the data contents of the first block and the second block are identical.

10. The stress testing method of a file system as claimed in claim 9, wherein the capacity of the first block and the second block is $2^n$ pages, and smaller than 1024 pages.

11. The stress testing method of a file system as claimed in claim 8, wherein the sample document transmission testing algorithm comprises:

a. allocating a first registering space and a second registering space in the computer;

b. writing the content of a sample document into the first registering space;

c. duplicating the sample document to obtain a duplicated document, and writing the duplicated document into a target system disk under test;

d. reading the duplicated document from the target system disk, and writing the content of the duplicated document into the second registering space;

e. comparing the content of the first registering space and the second registering space to obtain a test result; and f. repeating the above steps a-e to complete the preset test times.

12. The stress testing method of a file system as claimed in claim 11, wherein the capacity of the sample document is $2^n$ byte, and smaller than 256 K byte.

13. The stress testing method of a file system as claimed in claim 11, wherein the sample document transmission testing algorithm further comprises calling a multi-threading to execute multiple tests at the same time.

14. The stress testing method of a file system as claimed in claim 8, wherein the document mapping testing algorithm comprises a file read test comprising:

a. reading a document from a target system disk, and mapping the identification data and content of the document to a document mapping space in the memory of the computer;

b. duplicating the document to a registering space allocated by the computer; and c. comparing to see whether the contents of the document mapping space and the registering space are identical, so as to obtain a test result.

15. The stress testing method of a file system as claimed in claim 8, wherein the document mapping testing algorithm comprises a file write test comprising:

a. establishing a document, and duplicating the document to a registering space allocated by the computer;

b. writing the document into a target system disk, and mapping the identification data and content of the document to a document mapping space in the memory of the computer; and c. comparing to see whether the contents of the document mapping space and the registering space are identical, so as to obtain a test result.

16. The stress testing method of a file system as claimed in claim 8, wherein the large capacity document transmission testing algorithm comprises an intensive stress test comprising:

a. verifying remaining capacities of a first target system disk and a second target system disk, and adjusting the capacity of a document according to a minimum remaining capacity;

b. allocating a registering space having the same capacity as the document in the computer, and filling the registering space with a test data;

c. copying the content of the registering space to the document, and writing the document into the first target system disk and the second target system disk; and d. comparing to see whether the contents of the documents in the first target system disk and the second target system disk are identical, so as to obtain a test result.

17. The stress testing method of a file system as claimed in claim 16, wherein the preset capacity of the document is selected from 200 M byte, 500 M byte, and 1 G byte.

18. The stress testing method of a file system as claimed in claim 8, wherein the large capacity document transmission test algorithm comprises a high efficiency test comprising:

allocating a registering space in the computer, and filling the registering space with a test data;

verifying that the remaining capacities of a first target system disk and a second target system disk are larger than the registering space;

writing the content of the registering space into the first target system disk in multiple consecutive times to form a document;

transmitting the document to the second target system disk; and respectively comparing to see whether the content of the registering space is identical to the content of the document in the first target system disk and the content of the document in the second target system disk, so as to obtain a test result.

* * * * *